(12) United States Patent
Xie

(10) Patent No.: US 10,491,548 B2
(45) Date of Patent: Nov. 26, 2019

(54) TECHNIQUES TO CONFIGURE BOT FLOW

(71) Applicant: Facebook, Inc., Menlo Park, CA (US)

(72) Inventor: Tianyu Xie, Jersey City, NJ (US)

(73) Assignee: FACEBOOK, INC., Menlo Park, CA (US)

( * ) Notice: Subject to any disclaimer, the term of this patent is extended or adjusted under 35 U.S.C. 154(b) by 136 days.

(21) Appl. No.: 15/488,964

(22) Filed: Apr. 17, 2017

(65) Prior Publication Data
US 2018/0302346 A1    Oct. 18, 2018

(51) Int. Cl.
*G06F 15/16* (2006.01)
*H04L 12/58* (2006.01)
*H04L 29/08* (2006.01)

(52) U.S. Cl.
CPC ............ *H04L 51/02* (2013.01); *H04L 51/063* (2013.01); *H04L 67/02* (2013.01)

(58) Field of Classification Search
CPC ........ H04L 51/02; H04L 51/063; H04L 67/02
USPC .................................................. 709/206, 207
See application file for complete search history.

(56) References Cited

U.S. PATENT DOCUMENTS

| | | | |
|---|---|---|---|
| 2012/0210393 A1* | 8/2012 | Yamahara | G06F 21/31 726/2 |
| 2018/0083894 A1* | 3/2018 | Fung | H04L 51/02 |
| 2018/0083901 A1* | 3/2018 | McGregor, Jr. | H04L 51/10 |
| 2018/0129484 A1* | 5/2018 | Kannan | G06F 8/34 |
| 2018/0131642 A1* | 5/2018 | Trufinescu | H04L 51/02 |
| 2018/0145935 A1* | 5/2018 | Blokhin | H04L 51/046 |
| 2018/0210874 A1* | 7/2018 | Fuxman | G06F 17/2785 |

\* cited by examiner

*Primary Examiner* — Karen C Tang

(57) ABSTRACT

Techniques to configure bot flow are described. In one embodiment, an apparatus may comprise a web application hosting component operative to receive a bot-configuration requests from a web client, the bot-configuration request corresponding to a developer account for a bot system; and provide a web-based application to the web client; and a web application preparation component operative to prepare the web-based application for the web client, the web-based application comprising a message composer interface and a message flow interface, wherein the message flow interface is operative to display branching message flow between a plurality of bot messages configured in the message composer interface. Other embodiments are described and claimed.

20 Claims, 9 Drawing Sheets

*400*

```
Receive a bot-configuration requests from a web client, the
bot-configuration request corresponding to a developer
account for a bot system.
402
```

```
Prepare a web-based application for the web client, the web-
based application comprising a message composer interface
and a message flow interface, wherein the message flow
interface is operative to display branching message flow
between a plurality of bot messages configured in the
message composer interface.
404
```

```
Provide the web-based application to the web client.
406
```

TECHNIQUES TO CONFIGURE BOT FLOW

BACKGROUND

Users may interact with each other in a messaging system, sending messages back and forth to each other in a text-based conversation between two or more users. A user may have a user account associated with them in the messaging system, the user account providing an online identity for the user, a destination for messages directed to the user, and generally coordinating the user's access to and use of the messaging system. A user may access the messaging system from a variety of endpoints, including mobile devices (e.g., cellphones), desktop computers, web browsers, specialized messaging applications, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to configure bot flow. Some embodiments are particularly directed to techniques to configure bot flow without coding. In one embodiment, for example, an apparatus may comprise a web application hosting component operative to receive a bot-configuration requests from a web client, the bot-configuration request corresponding to a developer account for a bot system; and provide a web-based application to the web client; and a web application preparation component operative to prepare the web-based application for the web client, the web-based application comprising a message composer interface and a message flow interface, wherein the message flow interface is operative to display branching message flow between a plurality of bot messages configured in the message composer interface. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 4 illustrates an embodiment of a logic flow for the system of FIG. 1.

DETAILED DESCRIPTION

Figure 1:
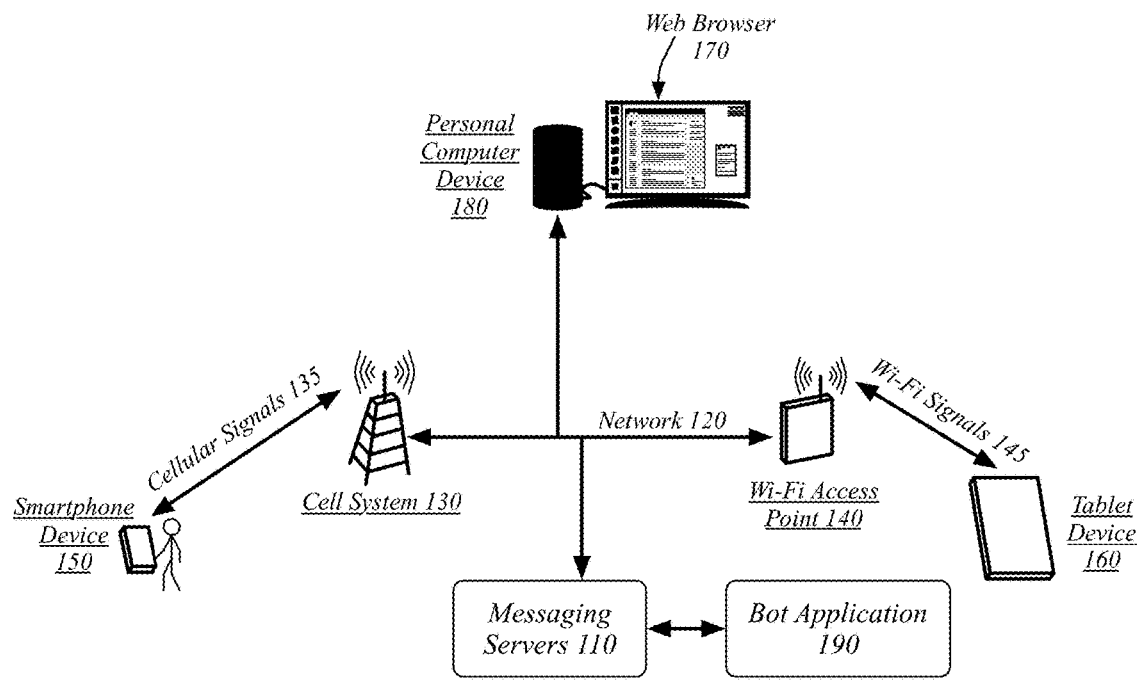
FIG. 1 illustrates an embodiment of a system.

To aid a user in interacting with a service via a messaging context, services may be represented as messaging bots within a messaging system. A messaging bot may be an automated front-end to a network-accessible service that can be represented as a participant within a message thread. In some cases, a messaging bot may be corresponded with in a message thread that explicitly includes the messaging bot, such as a one-on-one message thread between a particular user and the messaging bot. In other cases, a messaging bot may be corresponded with in a message thread in which the messaging bot is not a regular participant, the messaging bot a temporary participant in the message thread for the purposes of interacting with the service. The messaging bot may be included as a temporary participant in any other thread, whether a one-on-one thread between two users or a group thread between multiple users.

As such, a user may engage with network services within the familiar experience of a messaging client. Further, by using a messaging client, a user may engage with network services within a messaging context so as to allow the inclusion of other people. In some cases, this may simply inform the other people as to the services, such as letting friends or family know about transportation details. In other cases, this may empower the performance of services for multiple people, such as where dinner, a ride, entertainment, or other service is arranged for the use of multiple people. As a result, the embodiments can improve the experience of using network-accessible services and can extend the reach of network-accessible services to the user of a messaging system.

At least some portion of the behavior of a bot application may be defined without the use of custom code developer developed by the developer of the bot application. Instead, a deterministic message flow may be specified using a non-coding interface. Outgoing messages and responses to incoming messages may be specified in a visual interface. Portions of the bot application that use custom code may then be segregated off and defined by a developer, involving a code developer only where beneficial. This empowers a non-coding developer to develop as much of a bot application without coding as possible. As a result, the embodiments can improve affordability and practicality of bot development, which may then increase the number of bots available for use in a bot system.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-$a$ may include components 122-1, 122-2, 122-3, 122-4 and 122-5. The embodiments are not limited in this context.

FIG. 1 illustrates a block diagram for a bot design system 100.

A bot application 190, possibly of a plurality of bot applications, may operate within a network environment including a messaging system empowering the exchange of messages and other information. The bot application 190 may comprise a software application executing on a computer system. The bot application 190 may use a messaging system to exchange messages comprising user messages and bot messages. User messages may comprise user requests and messages clarifying and specifying user requests. Bot messages may clarify requests for information relating to user requests and performance information relating to user requests. In some cases, the messaging system may comprise a general messaging system also used for other messages. In other cases, the messaging system may comprise a messaging system exclusive to communicating with bot applications.

The messaging servers 110 may comprise one or more messaging servers operated by a messaging system as part of the bot design system 100. A messaging server may comprise an Internet-accessible server, with the network 120 connecting the various devices of the bot design system 100 comprising, at least in part, the Internet.

A user may own and operate a smartphone device 150. The smartphone device 150 may comprise an iPhone® device, an Android® device, a Blackberry® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging servers 110.

The same user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging servers 110.

The same user may own and operate a personal computer device 180. The personal computer device 180 may comprise a Mac OS® device, Windows® device, Linux® device, or other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the messaging servers 110.

A messaging client may be a dedicated messaging client. A dedicated messaging client may be specifically associated with a messaging provider administering the messaging system including the messaging servers 110. A dedicated messaging client may be a general client operative to work with a plurality of different messaging providers including the messaging provider administering the messaging system including the messaging servers 110. A messaging client may empower access to bot applications for the performance of services, such as where the bot applications are one of a plurality of endpoints and/or services accessible via the messaging servers 110.

The messaging client may be a component of an application providing additional functionality. For example, a social networking service may provide a social networking application for use on a mobile device for accessing and using the social networking service. The social networking service may include messaging functionality such as may be provided by messaging servers 110. It will be appreciated that the messaging servers 110 may be one component of a computing device for a social networking service, with the computing device providing additional functionality of the social networking service. Similarly, a social networking application may provide both messaging functionality and additional functionality.

In some cases a messaging endpoint may retain state between user sessions and in some cases a messaging endpoint may relinquish state between user session. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML5 code that interacts with the messaging server to present messaging functionality to a user.

A user may send and receive messages from a plurality of devices, including the smartphone device 150, tablet device 160, and personal computer device 180. The user may use a first messaging application on the smartphone device 150, a second messaging application on the tablet device 160, and the web browser 170 on the personal computer device 180. Messaging applications on different devices may comprise installations of the same application on both devices. Messaging applications on different devices may comprise smartphone-specific and tablet-specific versions of a common application. Messaging applications on different devices may comprise distinct applications.

The user may benefit from having their message inbox kept consistent between their devices. A user may use their smartphone device 150 on the cell system 130 while away from their home, sending and receiving messages via the cells system 130. The user may stop by a coffee shop, or other location offering Wi-Fi, and connect their tablet device 160 to a Wi-Fi access point 140. The tablet device 160 may retrieve its existing known state for the message inbox and receive updates that have happened since the last occasion on which the tablet device 160 had access to a network, including any messages sent by the smartphone device 150 and that may have been received by the user while operating the smartphone device 150. The user may then return home and access their message inbox using a web browser 170 on a personal computer device 180. The web browser 170 may receive a snapshot of the current state of the message inbox from the messaging servers 110 due to it not maintaining or otherwise not having access to an existing state for the message inbox. The web browser 170 may then retrieve incremental updates for any new changes to the state of the message inbox so long as it maintains a user session with the messaging servers 110, discarding its known state for the message inbox at the end of the session, such as when the web browser 170 is closed by the user. Without limitation, an update may correspond to the addition of a message to a inbox, a deletion of a message from a inbox, and a read receipt.

A bot design system 100 may operate by defining a messaging inbox as comprising a plurality of messages, wherein each message is an individual transaction of communication between two or more participants. A messaging server may operate by maintaining a message index for the messaging inbox. Messaging servers may receive messages and store the messages in message archives from which messages may be retrieved through reference to the message index. Messaging clients may connect to the messaging servers and retrieve messages that have been added to their message archive since their last update. The messaging clients may receive a message index from the message archive indicating what messages are stored in the message archive. The messaging clients may compare the message archive to their current inbox in order to determine what messages they are missing, which they then request from the message archive. The messaging clients may make changes to their inbox, which results in message inbox instructions being transmitted to the message archives instructing the message archives in modifications to make to the representation of their message inbox on the message archives.

Messaging interactions mediated by a messaging system may be organized into shared spaces known as message threads. A message thread may collect together the messages shared between a particular group of users. Messages sent individually between a pair of users may be collected into a one-on-one message thread uniquely associated with the private messaging between the pair of users. Messages sent between a group of three or more users may not be uniquely defined by their membership, but instead by, in some embodiments, an identifier uniquely identifying the group thread. Membership in a group thread may, in some embodiments, vary over time, adding and/or losing members. A message thread may be between, for instance, a user and a messaging bot, wherein the user accesses the message thread to engage in messaging with the messaging bot in order to submit requests and engage in a dialog regarding requests.

The bot design system 100 may use knowledge generated from interactions in between users. The bot design system 100 may comprise a component of a social-networking system and may use knowledge generated from the broader interactions of the social-networking system. As such, to protect the privacy of the users of the bot design system 100 and the larger social-networking system, bot design system 100 may include an authorization server (or other suitable component(s)) that allows users to opt in to or opt out of having their actions logged by the bot design system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the bot design system 100 and other elements of a social-networking system through blocking, data hashing, anonymization, or other suitable techniques as appropriate.

Figure 2:
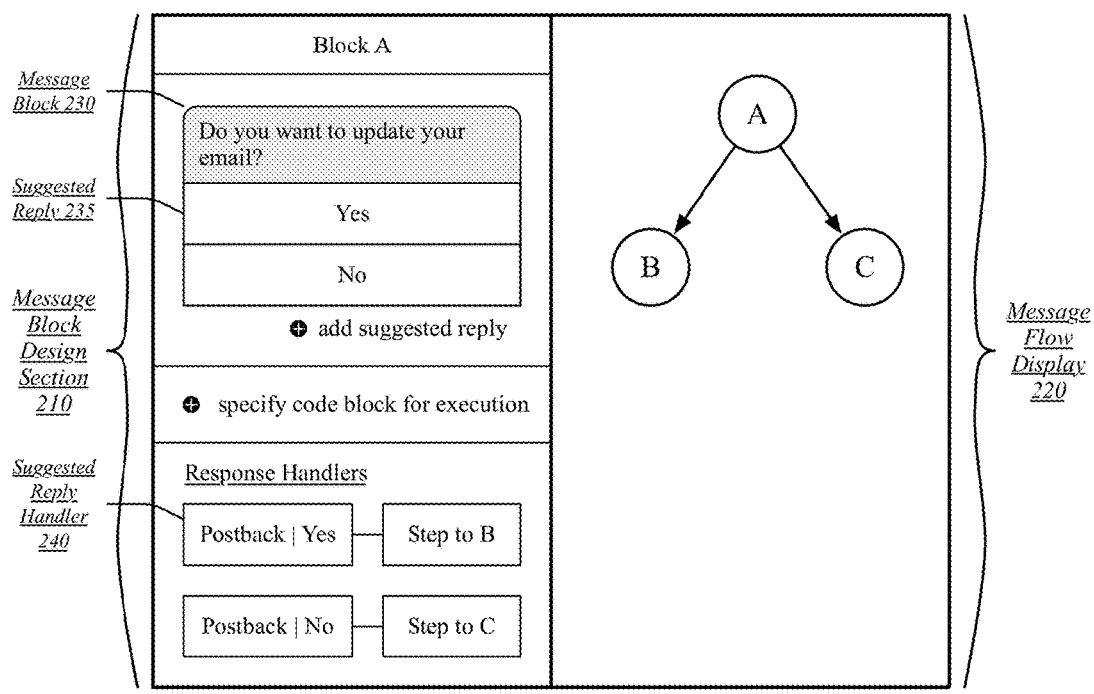
FIG. 2 illustrates an embodiment of a user interface for a development interface.

FIG. 2 illustrates an embodiment of a user interface 200 for a development interface.

A user interface 200 may be displayed on a client device. The client device may correspond to, without limitation, a smartphone device 150, a personal computer device 180, a tablet device 160, or any other form of client device. The user interface 200 may be displayed via a web browser, such as may execute on a smartphone device 150, tablet device 160, personal computer device 180, or other device. The user interface 200 may comprise a development interface for a web-based application for the design and configuration of a bot application 190. In some embodiments, a development interface may be displayed in a web browser accessing a web site for the bot design system 100, with the development interface hosted by the bot design system 100 and executing as a web-based application on the client device.

The development interface includes a message block design section 210. The message block design section 210 empowers a developer to configure bot messages. The developer can define a message block 230. The message block 230 includes an outgoing bot message, configured to be sent from the bot to a user interacting with the bot. The developer composes the text of the outgoing bot message in the message block design section 210. The message block 230 may include one or more suggested replies. A suggested reply 235 is a prewritten reply, specified by the bot developer, provided to the bot user. The user is able to select the suggested reply 235, such as by pressing it on a touch-screen interface, and have it sent back to the bot as a message. The use of a suggested reply 235 by the user may be marked in the message package used to send the user's responding message as being a selected suggested reply. The message block 320 may be associated with a suggested-reply add control, empowering the developer to add an additional suggested reply.

The message block design section 210 empowers the developer to specify response handlers. A response handler specifies how various possible responses from the user are to be handled. A response handler may comprise a suggested reply handler 240. A suggested reply handler 240 describes how a suggested reply 235 being received from a user is to be handled. For instance, a suggested reply handler 240 may specify that when a suggested reply 235 is received as a response to a message block 230, that the message flow should proceed to a particular other message block. Other response handlers may be included, such as a response handler to specify how custom user text should be responded to. Response handlers may include the invocation of bot code blocks. Bot code blocks may be coded by the developer, may draw from a pool of prewritten code blocks, or may be marked as an undeveloped code block for future development. Response handlers may be specified based on predefined types of responses. In some embodiments, each suggested reply for the message block 230 may be suggested for specification via a response handler as well as the specification of a response handler for a user message that isn't any of the suggested responses.

The message block design section 210 may include a code block addition control. A code block addition control empowers the developer to specify that a code block should be executed as part of the sending of the message block 230 to the user. For example, the code block may generate at least a portion of the outgoing message text of the message block 230. These bot code blocks may be coded by the developer, may draw from a pool of prewritten code blocks, or may be marked as an undeveloped code block for future development.

The developer interface may include a message flow display 220. The message flow display 220 displays a visual representation of the relationships between the various message blocks of the bot application being developed. The message blocks of the bot application may be displayed as a directed graph. Each message block may be displayed as a node in the directed graph, such as through a distinct visual indicator in the message flow display 220. A directed edge may be drawn from a first message block to a second message block when the second message block is specified as a subsequent message block in a response handler for the first message block. As such, the message flow display 220 may visually communicate the message flow being configured for the bot application in the developer interface.

Figure 3:
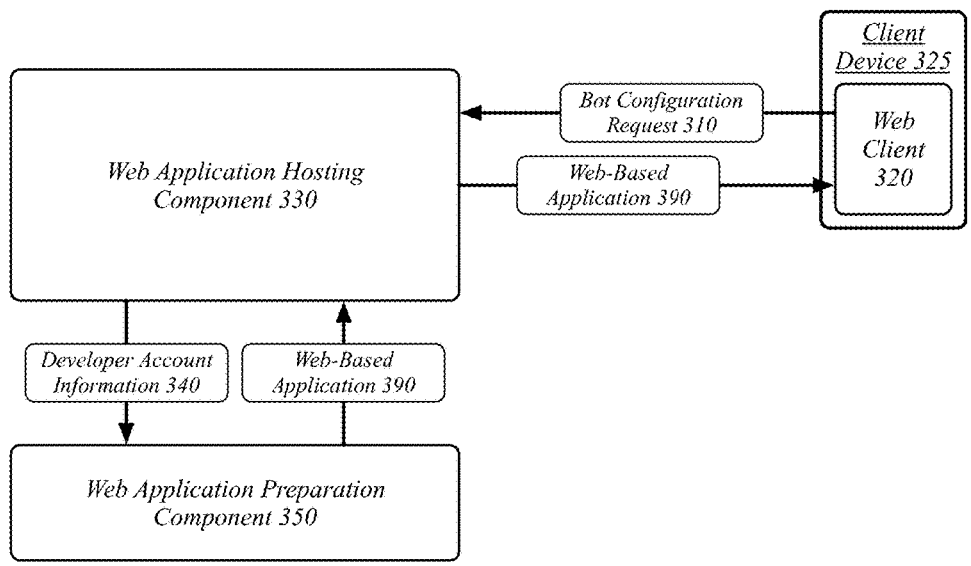
FIG. 3 illustrates an embodiment of a bot design system configuring a web-based application based on a bot configuration request.

FIG. 3 illustrates an embodiment of a bot design system 100 configuring a web-based application 390 based on a bot configuration request 310.

The bot design system 100 may comprise a computer-implemented system having software applications comprising one or more components. Although the bot design system 100 shown in FIG. 3 has a limited number of elements in a certain topology, it may be appreciated that the bot design system 100 may include more or less elements in alternate topologies as desired for a given implementation.

The bot design system 100 may include one or more components operative to prepare, provide, and assist in developer use and management of a web-based application 390 providing bot development tools in a bot development environment. The bot design system 100 may comprise a web application hosting component 330 and a web application preparation component 350, without limitation.

The web application hosting component 330 is generally arranged to host a web-based application 390 for one or more client devices. The web-based application 390 empowers development of bots for use with a bot system. The web-based application 390 may specifically empower development of messaging bots for use with a messaging system. The web application hosting component 330 may use known techniques to serve a web-based application 390 to a web client 320, such as may include the use of client-side executable code and/or server-side executable code, without limitation.

The web application hosting component 330 receives a bot-configuration request 310 from a web client 320. The web client 320 may comprise a web browser application executing on a client device 325. The client device 325 may comprise any type of client device, such as a smartphone device 150, tablet device 160, or personal computer device 180. The web client 320 may comprise a web browser 170 on a personal computer device 180.

The web application hosting component 330 may authenticate the web client 320 for use with the bot design system 100. The web application hosting component 330 may authenticate the web client 320 to a developer account for a bot system, the developer account registered with the bot system to receive bot development support and access for a bot application 190 or a plurality of bot applications to the bot system. As such, the bot-configuration request 310 may correspond to a developer account for the bot system.

The bot configuration request 310 may specify a bot registered to the developer account to be configured by the web-based application 390. Alternatively, the specific bot to be developed may be specified after the web-based application 390 is provided to the web client 320.

The bot design system 100 further comprises a web application preparation component 350. The web application preparation component 350 is generally arranged to prepare the web-based application 390 for the web client 320. The web application hosting component 330 then provides the web-based application 390 to the web client 320 in response to the bot configuration request 310.

The web application preparation component 350 prepares the web-based application 390 for the web client 320. The web-based application 390 comprises a message composer interface and a message flow interface. The web-based application 390 may include additional interfaces, without limitation. The message composer interface empowers the specification of message blocks. The message blocks may include message text elements, one or more suggested replies, and may use one or more code blocks selected or requested via the message composer interface. The message composer interface may be displayed as a message block design section 210 in a developer interface for the web-based application 390. The message flow interface is operative to display branching message flow between a plurality of bot messages configured in the message composer interface.

The plurality of bot messages may comprise a plurality of message text elements and a plurality of suggested replies. Each of the bot messages comprises message text, each specified explicitly at the time of creation or making use of the output of a code block. At least some of the bot messages may comprise one or more suggested replies. Each of the plurality of suggested replies links to subsequent bot messages of the plurality of bot messages. An individual suggest reply links to a particular subsequent bot message. The message flow interface is operative to display links between the plurality of suggested replies and the plurality of bot messages as the branching message flow. The plurality of bot messages may comprise a plurality of message text elements, a plurality of suggested replies, and a plurality of bot code blocks. A bot code block may be indicated as producing output to be included in the message text for a bot message. A bot code block may be indicated as taking as input information gathered as part of the branching message flow, or otherwise available to the bot design system 100 (e.g., social-networking information, messaging system information), to perform bot operations.

In some cases, the plurality of bot messages may comprise a plurality of message text elements, a plurality of suggested replies, and a plurality of undeveloped code references. An undeveloped code reference indicates bot code that has yet to be developed. An undeveloped code reference may be included by a non-coding developer to indicate future work to be done by a coding developer. Alternatively, an undeveloped code reference may be included by a coding developer to indicate future work for themselves or another coding developer. These undeveloped code references are marked for bot code development by a coding developer. A coding developer may request and receive a set of undeveloped code references for the bot application so as to enable them to develop the bot code. The undeveloped code references may comprise coded function descriptions written by the developer of the message block(s) referencing the undeveloped code references so as to aid the development of the bot code for the undeveloped code references. Coded function descriptions may comprise natural-language text descriptions describing the expected input to the bot code, the desired output of the bot code, and/or the expected operations of the bot code, without limitation.

The message flow interface may display indicators indicating work to be done in the development of the bot application. The message flow interface is operative to display incomplete bot message indicators in association with undeveloped code references in the branching message flow. A node for a bot message in the display of the branching message flow may be marked with a visual incomplete bot message indicator indicating that the bot message has an undeveloped code reference and that, therefore, bot code development is needed to complete the bot message.

The web-based application is operative to configure the branching message flow based on specified processing results from the undeveloped code references. For example, a piece of bot code may produce output that controls the message flow, such that the output of the bot code determines the subsequent message block for a bot message that should be traversed to following the current message block for the current bot message. The current message block for the current bot message may specify how different outputs from the bot code should result in different message blocks to be processed as the subsequent message block. The visual display of a graph of the branching message flow may represent these branches as edges in the graph based on the specification of how different outputs from the bot code should result in different subsequent message blocks.

The web-based application may comprise a bot code module selection interface as part of the message block design section 210 of the interface. The bot code module selection interface is configured by the web application preparation component 350 to access a bot code module repository of existing bot code modules. This bot code module repository is hosted by the bot design system 100 to store and make available bot code modules that have already been developed. The bot code modules may have been developed by the maintainer of the web application hosting component 330 and web application preparation component 350, and a larger messaging system and/or social-networking system. However, bot code modules from third-party developers may also be included in the bot code module repository where permission is received from the third-party developers. Bot code developers may be encouraged to share bot code modules they develop in order to improve the bot ecosystem. The bot code module selection interface displays one or more bot code modules of the bot code module repository and may configure a bot application to use one or more selected bot code modules of the bot code module repository. The bot code module selection interface may allow searching, browsing, categorized browsing, or any other bot code module discovery techniques.

The web application preparation component 350 preparing the web-based application for the web client 320 may comprise providing an natural-language-processing-system access token to the web-based application. A natural-language-processing (NLP) system may provide NLP services to bot applications. For example, user-entered text sequences, corresponding to user responses to bot messages other than the suggested replies, may be analyzed by an NLP system. A bot message block may indicate various possible outputs from the NLP system that it may react to and actions to be taken in response to those possible outputs, such as subsequent message blocks to proceed to, information to be stored, or other operations. These actions may be represented in the branching message flow. The web-based application 390 may be configured by the web application preparation component 350 to use the natural-language-processing-system access token to authorize the bot application to access the NLP system. The web-based application 390 is then further operative to configure the bot application to access the NLP system. The web-based application 390 is operative to configure branching message flow based on specified processing results from the NLP system.

The web-based application 390 may be operative to detect potential problems with a configured branching message flow and to alert the developer to these potential problems. The web-based application 390 may be operative to detect one or more loops in the branching message flow and display a notification indicating the one or more loops in the branching message flow. As the branching message flow is a directed graph, loop-detection techniques for directed graphs may be applied to the branching message flow by the web-based application 390.

The web-based application 390 may be operative to detect one or more undeveloped edges in the branching message flow and display a notification indicating the one or more undeveloped edges in the branching message flow. An undeveloped edge in the branching message flow may correspond to a suggested reply for a message block that has not been linked to a subsequent message block. An undeveloped edge in the branching message flow may correspond to leaving unspecified how to process a user-entered text reply to a message block, such that the message block has not been linked to a subsequent message block for user-entered text replies. The web-based application 390 may detect the one or more undeveloped edges through an iterative examination of the configured response handlers for each of the message blocks of the bot application.

API calls to a bot application may rely on the programming of bot code to enact the API calls to the bot application. The performance of tasks specific to a particular bot application may rely on custom coding of tasks for the bot application. However, some elements of the development of bot code may be standardized for multiple bots and multiple developers, across the bot system. For example, authenticating a bot application with a bot system, communicating with the bot system, identifying users of the bot system, and managing sessions with users of the bot system, may all be substantially similar across different developed bot applications for the bot system. As such, a developer may benefit from only having to code the bot code that pertains to the bot API calls that are specific to the bot application. The surrounding functionality may be supported according to libraries provided by the bot system.

The web-based application 390 may comprise a bot hosting library. The web-based application 390 is then operative to deploy the branching message flow for a bot application to a server host system using the bot hosting library. The bot hosting library may comprise functions for one or more of user identifier handling, messaging system authentication, messaging system communication, and messaging session management. The web-based application 390 may empower the developer to select a server host system and them deploy the bot application comprising the branching message flow to the server host system. The web-based application may specifically comprise a deployment control, the deployment control operative to activate the web-based application to transfer bot code from the code development interface to a server host system.

The web-based application comprising a save control, the save control operative to store the branching message flow of the plurality of bot messages as a file, such as a JavaScript Object Notation (JSON) file. In general, any portion of the bot application configured using the web-based application 390 may be stored in a file. The file may be hosted by the servers of the bot design system 100, such as are accessible to the web application hosting component 330 and web application preparation component 350. Alternatively, the file may be stored to a user's local storage, own server-based storage, or to any other storage technology.

The bot design system 100 may empower multilingual support for bot applications based on an automated translation system. The plurality of bot messages of a bot application may comprise a plurality of message text elements and a plurality of suggested replies. The web-based application 390 may submit the plurality of message text elements and the plurality of suggested replies to an automated translation system, the automated translation system operative to perform automated language translation of text sequences. The web-based application 390 receives a plurality of translated message text elements and a plurality of translated suggested replies from the automated translation system, with the plurality of translated message text elements correspond to the plurality of message text elements and the plurality of translated suggested replies corresponding to the plurality of suggested replies. Specifically, the plurality of translated message text elements are automated translations of the plurality of message text elements into one or more other languages from the language the plurality of message text elements. Similarly, the plurality of translated suggested replies are automated translations of the plurality of suggested replies. The web-based application 390 then configures the bot application for multi-lingual support based on the plurality of translated message text elements and the plurality of translated suggested replies.

The web-based application is operative to configure one or more target user specifiers for the bot application and its branching message flow. A target user specifier indicates a group of target users for the bot application. A target user specifier may, without limitation, indicate demographic information, social-networking information, product preference information, service preference information, or any other sort of information. The one or more target user specifiers are registered to the bot application and used by a messaging system to promote the bot application to targeted users.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 4 illustrates one embodiment of a logic flow 400. The logic flow 400 may be representative of some or all of the operations executed by one or more embodiments described herein.

In the illustrated embodiment shown in FIG. 4, the logic flow 400 may receive a bot-configuration requests from a web client, the bot-configuration request corresponding to a developer account for a bot system at block 402.

The logic flow 400 may prepare a web-based application for the web client, the web-based application comprising a message composer interface and a message flow interface, wherein the message flow interface is operative to display branching message flow between a plurality of bot messages configured in the message composer interface at block 404.

The logic flow 400 may provide the web-based application to the web client at block 406.

The embodiments are not limited to this example.

Figure 5:
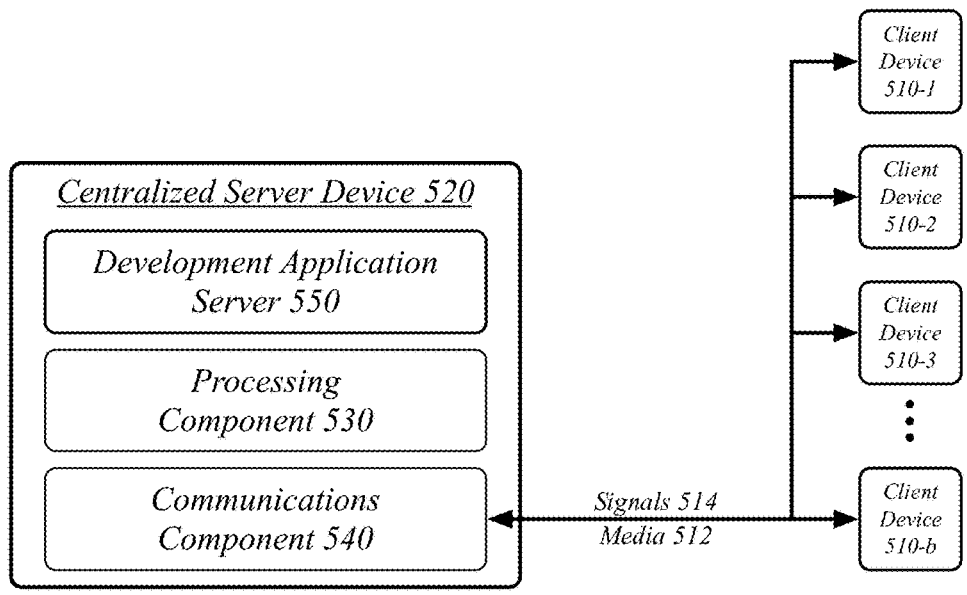
FIG. 5 illustrates an embodiment of a centralized system for the system of FIG. 1.

FIG. 5 illustrates a block diagram of a centralized system 500. The centralized system 500 may implement some or all of the structure and/or operations for the bot design system 100 in a single computing entity, such as entirely within a single centralized server device 520.

The centralized server device 520 may comprise any electronic device capable of receiving, processing, and sending information for the bot design system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 520 may execute processing operations or logic for the bot design system 100 using a processing component 530. The processing component 530 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 520 may execute communications operations or logic for the bot design system 100 using communications component 540. The communications component 540 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 540 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 512 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 520 may communicate with other devices over a communications media 512 using communications signals 514 via the communications component 540. The devices may be internal or external to the centralized server device 520 as desired for a given implementation.

The centralized server device 520 may execute a development application server 550. The development application server 550 may comprise a development application server of a plurality of development application servers for a bot design system 100. The development application server 550 may provide development support for bot developers. The development application server 550 may execute a web application hosting component 330 and a web application preparation component 330. The development application server 550 may support operations for a plurality of client devices 510. The client devices 510 may correspond to one or more of a smartphone device 150, tablet device 160, personal computer device 170, and/or any other client device.

Figure 6:
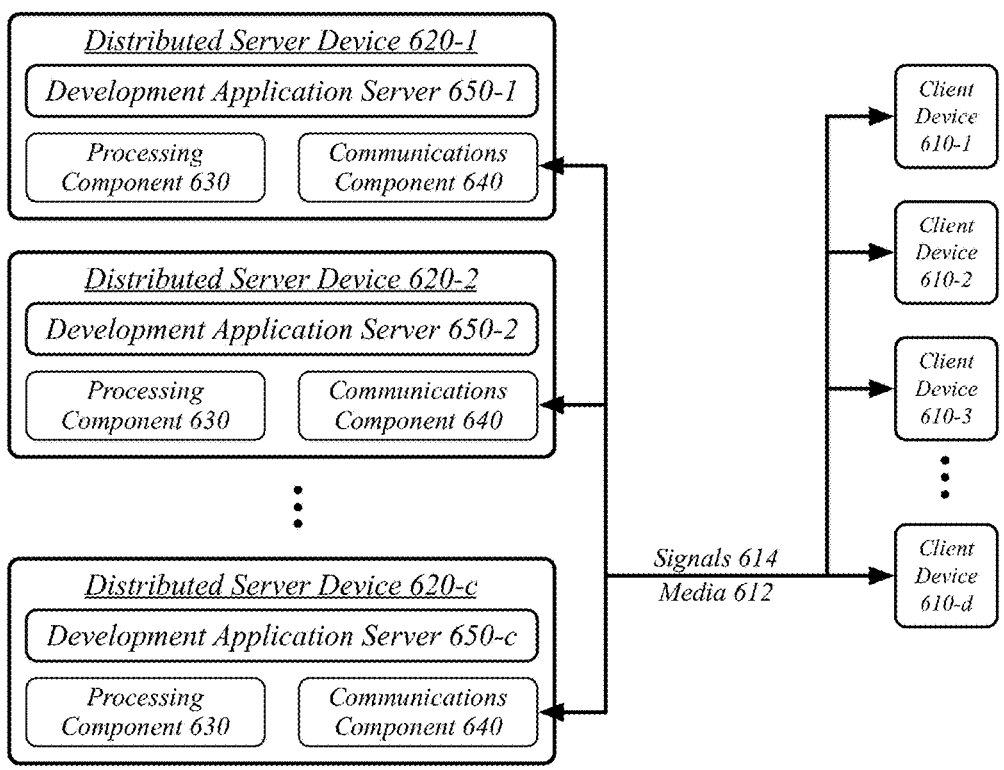
FIG. 6 illustrates an embodiment of a distributed system for the system of FIG. 1.

FIG. 6 illustrates a block diagram of a distributed system 600. The distributed system 600 may distribute portions of the structure and/or operations for the bot design system 100 across multiple computing entities. Examples of distributed system 600 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 600 may comprise a plurality of distributed server devices 620. In general, the distributed server devices 620 may be the same or similar to the centralized server device 520 as described with reference to FIG. 5. For instance, the distributed server devices 620 may each comprise a processing component 630 and a communications component 640 which are the same or similar to the processing component 530 and the communications component 540, respectively, as described with reference to FIG. 5. In another example, the distributed server devices 620 may communicate over a communications media 612 using communications signals 614 via the communications components 640.

The distributed server devices 620 may comprise or employ one or more server programs that operate to perform various methodologies in accordance with the described embodiments. In one embodiment, for example, the distributed server devices 620 may each execute a development application server 650. The development application servers 650 may provide development support for bot developers. The development application servers 650 may execute a web application hosting component 330 and a web application preparation component 330. The development application servers 650 may support operations for a plurality of client devices 510. The client devices 510 may correspond to one or more of a smartphone device 150, tablet device 160, personal computer device 170, and/or any other client device.

Figure 7:
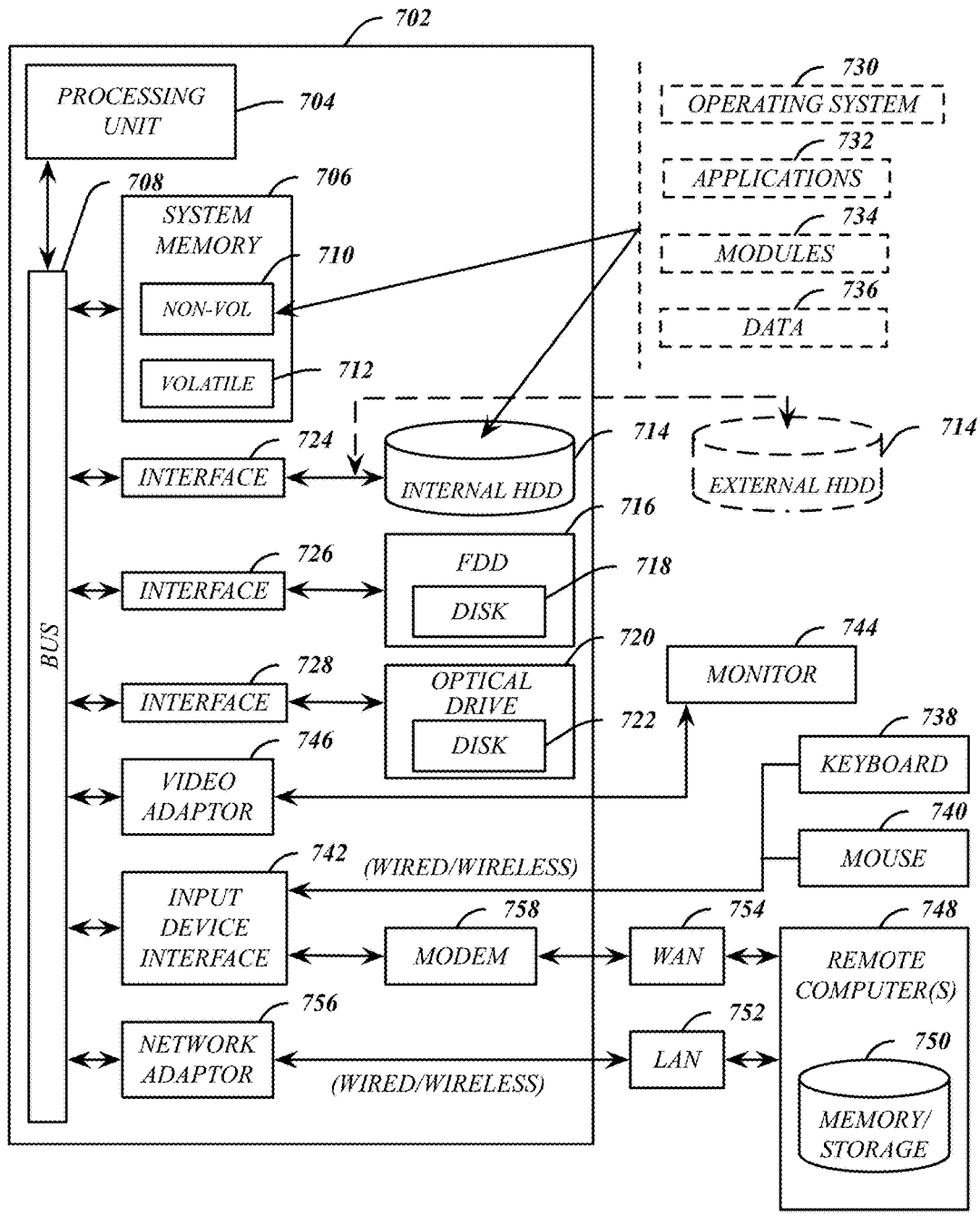
FIG. 7 illustrates an embodiment of a computing architecture.

FIG. 7 illustrates an embodiment of an exemplary computing architecture 700 suitable for implementing various embodiments as previously described. In one embodiment, the computing architecture 700 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chip-sets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 704.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the bot design system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756.

The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
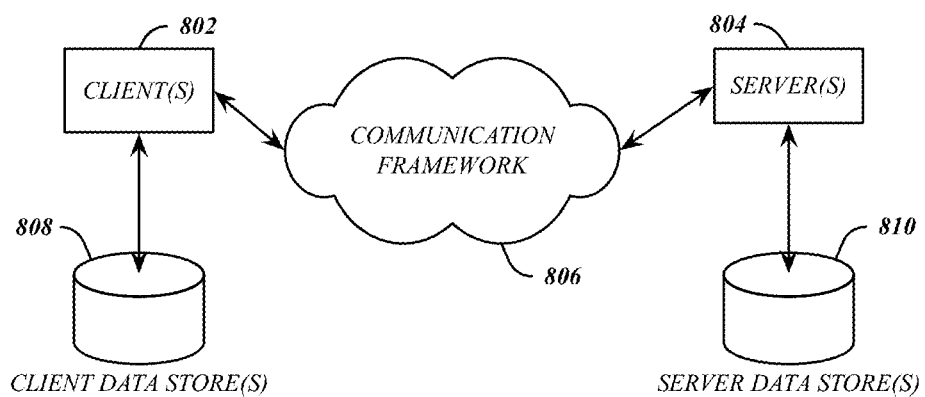
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 comprises includes one or more clients 802 and servers 804. The clients 802 may comprise clients, such as messaging clients, accessing the bot design system 100. The servers 804 may comprise servers providing server functions to the bot design system 100, such as messaging servers 110. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques and protocols. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 806 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 9:
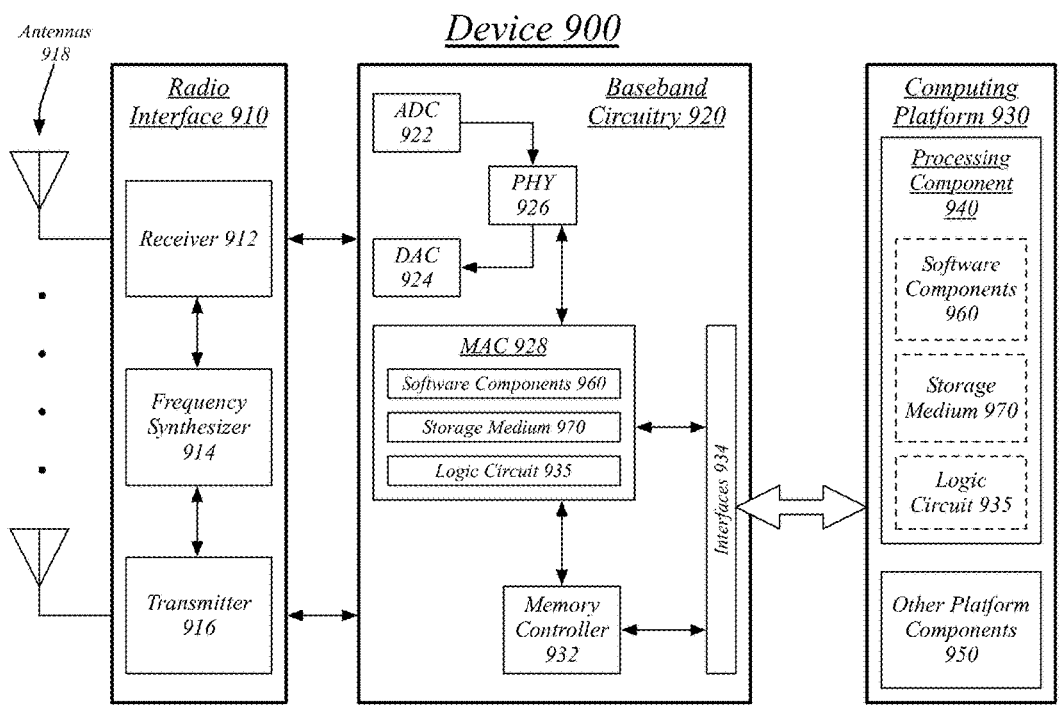
FIG. 9 illustrates an embodiment of a radio device architecture.

FIG. 9 illustrates an embodiment of a device 900 for use in a multicarrier OFDM system, such as the bot design system 100. Device 900 may implement, for example, software components 960 as described with reference to bot design system 100 and/or a logic circuit 935. The logic circuit 935 may include physical circuits to perform operations described for the bot design system 100. As shown in FIG. 9, device 900 may include a radio interface 910, baseband circuitry 920, and computing platform 930, although embodiments are not limited to this configuration.

The device 900 may implement some or all of the structure and/or operations for the bot design system 100 and/or logic circuit 935 in a single computing entity, such as entirely within a single device. Alternatively, the device 900 may distribute portions of the structure and/or operations for the bot design system 100 and/or logic circuit 935 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 910 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 910 may include, for example, a receiver 912, a transmitter 916 and/or a frequency synthesizer 914. Radio interface 910 may include bias controls, a crystal oscillator and/or one or more antennas 918. In another embodiment, radio interface 910 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 920 may communicate with radio interface 910 to process receive and/or transmit signals and may include, for example, an analog-to-digital converter 922 for down converting received signals, a digital-to-analog converter 924 for up converting signals for transmission. Further, baseband circuitry 920 may include a baseband or physical layer (PHY) processing circuit 956 for PHY link layer processing of respective receive/transmit signals. Baseband circuitry 920 may include, for example, a processing circuit 928 for medium access control (MAC)/data link layer processing. Baseband circuitry 920 may include a memory controller 932 for communicating with processing circuit 928 and/or a computing platform 930, for example, via one or more interfaces 934.

In some embodiments, PHY processing circuit 926 may include a frame construction and/or detection module, in combination with additional circuitry such as a buffer memory, to construct and/or deconstruct communication frames, such as radio frames. Alternatively or in addition, MAC processing circuit 928 may share processing for certain of these functions or perform these processes independent of PHY processing circuit 926. In some embodiments, MAC and PHY processing may be integrated into a single circuit.

The computing platform 930 may provide computing functionality for the device 900. As shown, the computing platform 930 may include a processing component 940. In addition to, or alternatively of, the baseband circuitry 920, the device 900 may execute processing operations or logic for the bot design system 100 and logic circuit 935 using the processing component 940. The processing component 940 (and/or PHY 926 and/or MAC 928) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 930 may further include other platform components 950. Other platform components 950 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 900 described herein, may be included or omitted in various embodiments of device 900, as suitably desired. In some embodiments, device 900 may be configured to be compatible with protocols and frequencies associated one or more of the 3GPP LTE Specifications and/or IEEE 902.16 Standards for WMANs, and/or other broadband wireless networks, cited herein, although the embodiments are not limited in this respect.

Embodiments of device 900 may be implemented using single input single output (SISO) architectures. However, certain implementations may include multiple antennas (e.g., antennas 918) for transmission and/or reception using adaptive antenna techniques for beamforming or spatial division multiple access (SDMA) and/or using MIMO communication techniques.

The components and features of device 900 may be implemented using any combination of discrete circuitry, application specific integrated circuits (ASICs), logic gates and/or single chip architectures. Further, the features of device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a bot-configuration requests from a web client, the bot-configuration request corresponding to a developer account for a bot system; preparing a web-based application for the web client, the web-based application comprising a message composer interface and a message flow interface, wherein the message flow interface is operative to display branching message flow between a plurality of bot messages configured in the message composer interface; and providing the web-based application to the web client.

A computer-implemented method may further comprise the web-based application comprising a deployment control, the deployment control operative to activate the web-based application to transfer bot code from the code development interface to a server host system.

A computer-implemented method may further comprise the web-based application comprising a save control, the save control operative to store the branching message flow of the plurality of bot messages as a JavaScript Object Notation (JSON) file.

A computer-implemented method may further comprise the plurality of bot messages comprising a plurality of message text elements and a plurality of suggested replies.

A computer-implemented method may further comprise wherein each of the plurality of suggested replies links to subsequent bot messages of the plurality of bot messages.

A computer-implemented method may further comprise the message flow interface operative to display links between the plurality of suggested replies and the plurality of bot messages as the branching message flow.

A computer-implemented method may further comprise the web-based application comprising a bot hosting library, the web-based application operative to deploy the branching message flow to a server host system using the bot hosting library, the bot hosting library comprising functions for one or more of user identifier handling, messaging system authentication, messaging system communication, and messaging session management.

A computer-implemented method may further comprise the plurality of bot messages comprising a plurality of message text elements and a plurality of suggested replies, further comprising: submitting the plurality of message text elements and the plurality of suggested replies to an automated translation system; receiving a plurality of translated message text elements and a plurality of translated suggested replies from the automated translation system, the plurality of translated message text elements corresponding to the plurality of message text elements, the plurality of translated suggested replies corresponding to the plurality of suggested replies; and configuring a bot application for multi-lingual support based on the plurality of translated message text elements and the plurality of translated suggested replies.

A computer-implemented method may further comprise the plurality of bot messages comprising a plurality of message text elements, a plurality of suggested replies, and a plurality of bot code blocks.

A computer-implemented method may further comprise the plurality of bot messages comprising a plurality of message text elements, a plurality of suggested replies, and a plurality of undeveloped code references, wherein the undeveloped code references are marked for bot code development.

A computer-implemented method may further comprise the undeveloped code references comprising coded function descriptions.

A computer-implemented method may further comprise the message flow interface operative to display incomplete bot message indicators in association with undeveloped code references in the branching message flow.

A computer-implemented method may further comprise the web-based application operative to configure the branching message flow based on specified processing results from the undeveloped code references.

A computer-implemented method may further comprise the web-based application comprising a bot code module selection interface, the bot code module selection interface configured to access a bot code module repository of existing bot code modules, display one or more bot code modules of the bot code module repository, and configure a bot application to use one or more selected bot code modules of the bot code module repository.

A computer-implemented method may further comprise wherein preparing the web-based application for the web client comprises providing an natural-language-processing-system access token to the web-based application.

A computer-implemented method may further comprise the web-based application operative to configure a bot application to access a natural-language-processing system, the web-based application operative to configure branching message flow based on specified processing results from the natural-language-processing system.

A computer-implemented method may further comprise the web-based application operative to detect one or more loops in the branching message flow and display a notification indicating the one or more loops in the branching message flow.

A computer-implemented method may further comprise the web-based application operative to detect one or more undeveloped edges in the branching message flow and display a notification indicating the one or more undeveloped edges in the branching message flow.

A computer-implemented method may further comprise the web-based application operative to configure one or more target user specifiers for the branching message flow.

An apparatus may comprise a web application hosting component operative to receive a bot-configuration requests from a web client, the bot-configuration request corresponding to a developer account for a bot system; and provide a web-based application to the web client; and a web application preparation component operative to prepare the web-based application for the web client, the web-based application comprising a message composer interface and a message flow interface, wherein the message flow interface is operative to display branching message flow between a plurality of bot messages configured in the message composer interface. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected"

and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
   receiving request from a web client for an application for configuring a bot, the request corresponding to a developer account for a bot system;
   preparing a web-based application for configuring the bot for the web client, the web-based application comprising:
      a message composer interface, the message composer interface displaying a user-selected step in a message flow for the bot and showing, for the step:
         text displayed by the bot at the step;
         one or more suggested user responses to the displayed text; and
         one or more response handlers, specifying a next step in the message flow based on the selected user response; and
      a message flow interface, wherein the message flow interface displays, as a directed graph, a branching step flow between the user-selected step in the message flow and the one or more response handlers for the user-selected step; and
   providing the web-based application for configuring the bot to the web client.

2. The method of claim 1, the plurality of bot messages comprising a plurality of message text elements and a plurality of suggested replies, wherein each of the plurality of suggested replies links to subsequent bot messages of the plurality of bot messages, the message flow interface operative to display links between the plurality of suggested replies and the plurality of bot messages as the branching message flow.

3. The method of claim 2, the web-based application comprising a bot hosting library, the web-based application operative to deploy the branching message flow to a server host system using the bot hosting library, the bot hosting library comprising functions for one or more of user identifier handling, messaging system authentication, messaging system communication, and messaging session management.

4. The method of claim 1, the plurality of bot messages comprising a plurality of message text elements and a plurality of suggested replies, further comprising:
   submitting the plurality of message text elements and the plurality of suggested replies to an automated translation system;
   receiving a plurality of translated message text elements and a plurality of translated suggested replies from the automated translation system, the plurality of translated message text elements corresponding to the plurality of message text elements, the plurality of translated suggested replies corresponding to the plurality of suggested replies; and
   configuring a bot application for multi-lingual support based on the plurality of translated message text elements and the plurality of translated suggested replies.

5. The method of claim 1, the plurality of bot messages comprising a plurality of message text elements, a plurality of suggested replies, and a plurality of undeveloped code references, wherein the undeveloped code references are marked for bot code development.

6. The method of claim 1, the web-based application comprising a bot code module selection interface, the bot code module selection interface configured to access a bot code module repository of existing bot code modules, display one or more bot code modules of the bot code module repository, and configure a bot application to use one or more selected bot code modules of the bot code module repository.

7. The method of claim 1, wherein preparing the web-based application for the web client comprises providing an natural-language-processing-system access token to the web-based application, the web-based application operative to configure a bot application to access a natural-language-processing system, the web-based application operative to configure branching message flow based on specified processing results from the natural-language-processing system.

8. An apparatus, comprising:
a processor;
memory, operatively coupled to the processor, the memory to store an application for execution by the processor, the application comprising:
a web application hosting component operative to:
receive a request from a web client for an application for configuring a bot, the request corresponding to a developer account for a bot system; and
provide a web-based application for configuring the bot to the web client; and
a web application preparation component operative to:
prepare the web-based application for configuring the bot for the web client, the web-based application comprising:
a message composer interface operative to display a user-selected step in a message flow for the bot and showing for the user-selected step text displayed by the bot at step, one or more suggested user responses to the displayed text and one or more response handlers, specifying a next step in the message flow based on the selected user response; and
a message flow interface operative to display, as a directed graph, a branching step flow between the user-selected step in the message flow and the one or more response handlers for the user-selected step.

9. The apparatus of claim 8, the plurality of bot messages comprising a plurality of message text elements and a plurality of suggested replies, wherein each of the plurality of suggested replies links to subsequent bot messages of the plurality of bot messages, the message flow interface operative to display links between the plurality of suggested replies and the plurality of bot messages as the branching message flow.

10. The apparatus of claim 9, the web-based application comprising a bot hosting library, the web-based application operative to deploy the branching message flow to a server host system using the bot hosting library, the bot hosting library comprising functions for one or more of user identifier handling, messaging system authentication, messaging system communication, and messaging session management.

11. The apparatus of claim 8, the plurality of bot messages comprising a plurality of message text elements and a plurality of suggested replies, further comprising:
the web-based application operative to submit the plurality of message text elements and the plurality of suggested replies to an automated translation system; receive a plurality of translated message text elements and a plurality of translated suggested replies from the automated translation system, the plurality of translated message text elements corresponding to the plurality of message text elements, the plurality of translated suggested replies corresponding to the plurality of suggested replies; and configure a bot application for multi-lingual support based on the plurality of translated message text elements and the plurality of translated suggested replies.

12. The apparatus of claim 8, the plurality of bot messages comprising a plurality of message text elements, a plurality of suggested replies, and a plurality of undeveloped code references, wherein the undeveloped code references are marked for bot code development.

13. The apparatus of claim 8, the web-based application comprising a bot code module selection interface, the bot code module selection interface configured to access a bot code module repository of existing bot code modules, display one or more bot code modules of the bot code module repository, and configure a bot application to use one or more selected bot code modules of the bot code module repository.

14. The apparatus of claim 8, wherein preparing the web-based application for the web client comprises providing an natural-language-processing-system access token to the web-based application, the web-based application operative to configure a bot application to access a natural-language-processing system, the web-based application operative to configure branching message flow based on specified processing results from the natural-language-processing system.

15. A non-transitory computer-readable storage medium comprising instructions that, when executed, cause a system to:
receive a request from a web client for an application for configuring a bot, the request corresponding to a developer account for a bot system;
prepare a web-based application for configuring the bot for the web client, the web-based application comprising:
a message composer interface, the message composer interface displaying a user-selected step in a message flow to the bot and showing, for the step:
text displayed by the bot at the step;
one or more suggested user responses to the displayed text; and
one or more response handlers, specifying a next step in the message flow based on the selected user response; and
a message flow interface, wherein the message flow interface displays, as a directed graph, a branching step flow between the user-selected step in the message flow in the one or more response handlers for the user-selected step; and
provide the web-based bot-configuration application to the web client.

16. The computer-readable storage medium of claim 15, the plurality of bot messages comprising a plurality of message text elements and a plurality of suggested replies, wherein each of the plurality of suggested replies links to subsequent bot messages of the plurality of bot messages, the message flow interface operative to display links between the plurality of suggested replies and the plurality of bot messages as the branching message flow.

17. The computer-readable storage medium of claim 15, the plurality of bot messages comprising a plurality of message text elements and a plurality of suggested replies, comprising further instructions that, when executed, cause a system to:
submit the plurality of message text elements and the plurality of suggested replies to an automated translation system;
receive a plurality of translated message text elements and a plurality of translated suggested replies from the automated translation system, the plurality of translated message text elements corresponding to the plurality of message text elements, the plurality of translated suggested replies corresponding to the plurality of suggested replies; and
configure a bot application for multi-lingual support based on the plurality of translated message text elements and the plurality of translated suggested replies.

18. The computer-readable storage medium of claim 15, the plurality of bot messages comprising a plurality of message text elements, a plurality of suggested replies, and a plurality of undeveloped code references, wherein the undeveloped code references are marked for bot code development.

19. The computer-readable storage medium of claim 15, the web-based application comprising a bot code module selection interface, the bot code module selection interface configured to access a bot code module repository of existing bot code modules, display one or more bot code modules of the bot code module repository, and configure a bot application to use one or more selected bot code modules of the bot code module repository.

20. The computer-readable storage medium of claim 15, wherein preparing the web-based application for the web client comprises providing an natural-language-processing-system access token to the web-based application, the web-based application operative to configure a bot application to access a natural-language-processing system, the web-based application operative to configure branching message flow based on specified processing results from the natural-language-processing system.

* * * * *